Aug. 27, 1968 W. C. HART 3,398,508
METHOD FOR REMOVING WATER AND HYDROCARBONS FROM GASEOUS HCl
Filed July 5, 1966
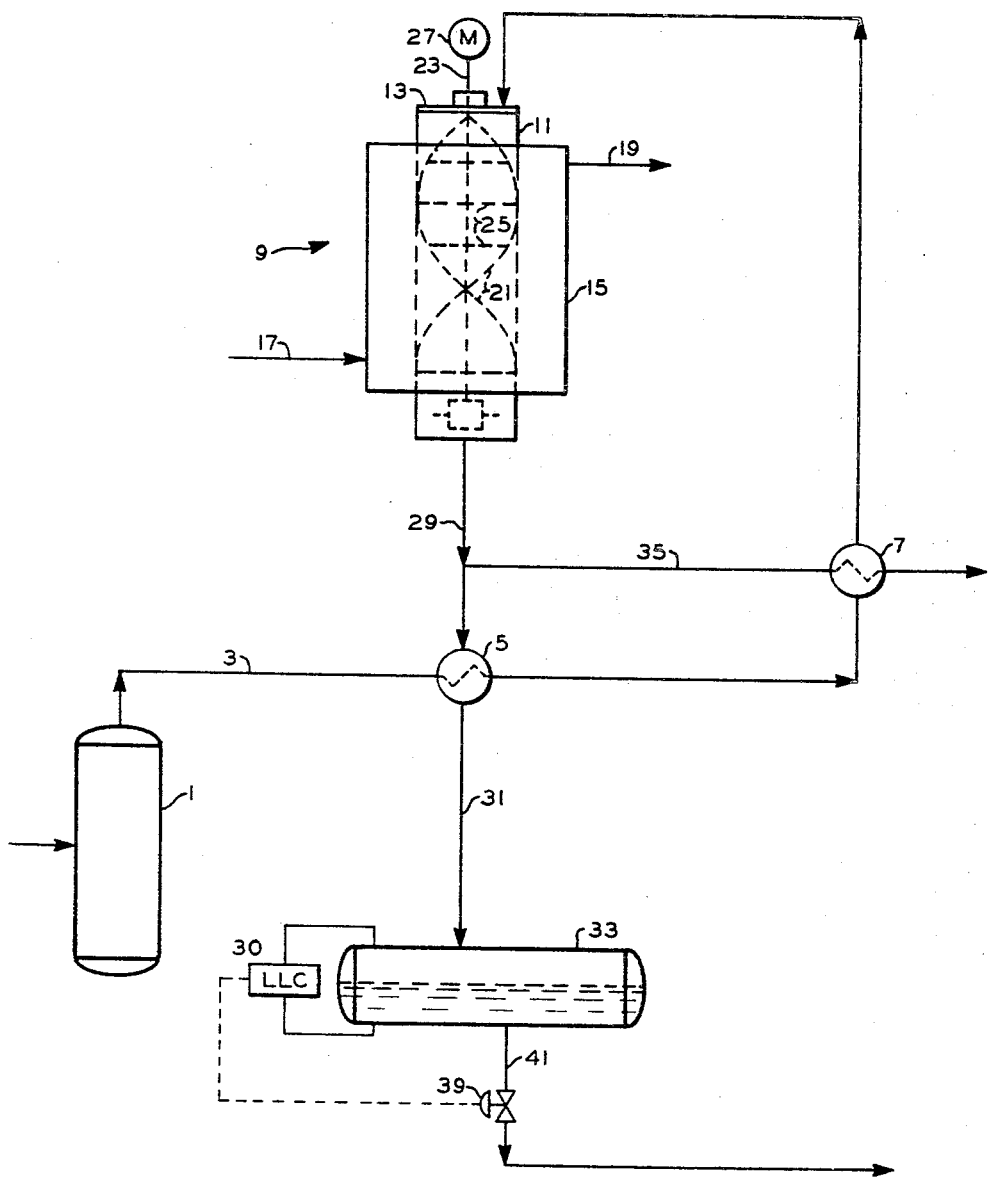
INVENTOR
W. C. HART
BY Young & Quigg
ATTORNEYS

United States Patent Office 3,398,508
Patented Aug. 27, 1968

3,398,508
METHOD FOR REMOVING WATER AND
HYDROCARBONS FROM GASEOUS HCl
Walter C. Hart, Bartlesville, Okla., assignor to Phillips
Petroleum Company, a corporation of Delaware
Filed July 5, 1966, Ser. No. 562,848
5 Claims. (Cl. 55—71)

ABSTRACT OF THE DISCLOSURE

A gaseous stream containing solidifiable impurities (such as HCl containing paraffin hydrocarbons of 9 to 16 carbon atoms and benzene) is purified by chilling said stream to form solid impurities on the wall of a chiller, scraping the solids off said wall to form a gas-solids stream, flowing said gas-solids stream at sufficient velocity in a straight line flow path to separate gas and solids by changing the direction of gas flow to allow the solids to continue in a straight line of flow.

---

The present invention relates to a method of purifying gases or vaporous streams. In one aspect the present invention relates to separating hydrocarbons from a gaseous stream of hydrogen chloride.

In the production of alkylate, HCl vapor is formed in rather large quantities as a byproduct. This HCl gas contains some impurities such as hydrocarbons. Numerous methods have been attempted to separate the hydrocarbons from the HCl vapor, but in each of these methods severe coating of the surfaces of the apparatus used has occurred, thereby seriously injuring the process and causing excessive losses due to poor heat transfer. For example, where a gaseous stream of HCl containing hydrocarbons is to be cooled and separated into its components, the hydrocarbons will separate out upon condensation and deposit and cake upon the surface of the chilling apparatus thereby disrupting the efficiency of the apparatus and upsetting proper heat transfer. If, for instance, a bank of tubes having a cooling fluid running therethrough is used in the heat exchange with the gaseous mixture, solid hydrocarbon deposits on the inner surfaces and forms an insulatory coating thereon which, after a short period of time, substantially reduces the effect of the coolant.

One object of the present invention is to provide a method for separating a gaseous stream from contaminants contained therein.

Another object of the present invention is to provide a method for preventing the caking of the contaminants onto the surfaces of the chilling apparatus employed in cooling a gaseous mixture containing the contaminants.

Yet another object of the present invention is to be provide a method for removing hydrocarbon from a gaseous HCl stream.

Other objects and many of the attendant advantages of this invention will be readily appreciated as the same becomes better understood by reference to the following detailed description which is to be considered in connection with the accompanying drawing wherein the sole figure sets forth a diagrammatic representation of the improvement in removing impurities from a vapor stream.

Briefly, this invention comprises steps of passing a gaseous mixture containing impurities through an elongated zone having walls capable of transmitting heat; gradually cooling said mixture in said zone to the point wherein the impurities are in a solid state and a gas-solids mixture results; scraping the solids from the walls of said elongated zone; passing said mixture through the zone at a rate of flow at which substantially all of the solid impurity component selectively settles therefrom; diverting the gas to free it from the solid impurity; passing the solid impurity into a melting zone; and recovering the purified gas.

With reference to the drawing, a gaseous vapor containing impurities is passed from vessel 1 via conduit 3 through an economy heat exchanger 5, a precooler 7 into a scraper chiller 9.

The scraper-chiller 9 comprises an inner cylindrical shell 11, one end of which is closed by an end member 13, and a cooling jacket 15 provided with an inlet conduit 17 and an outlet conduit 19. Agitating or scraping means 21 is positioned within cylindrical shell 11 and is designed to prevent accumulation of solid impurities from caking along the inner surface of cylindrical shell 11. This scraping means 21 can be constructed of strips of metal or other such suitable material known in the prior art. Scraping means can be fabricated in the form of a helix as shown in the drawing or it can be straight.

The scraping means 21 is mounted on a rotatable shaft 23 by means of ribs 25. Shaft 23 is axially positioned within cylindrical shell 11 and is connected to a suitable source of power such as motor 27 which causes rotation of the scraping means. The shaft 23 is suitably sealed in the end member 13 by means of a packing gland or of any other such sealing means known in the art.

Cooling of the gaseous mixture which enters the chiller 9 takes place in the section surrounded by the cooling jacket 15 and is achieved by passing a suitable coolant such as liquefied propane, ethane, ammonia, or other such suitable coolant to maintain an average temperature of about −20° F. inside shell 11.

The velocity of the gaseous mixture containing any impurities therein passing through the chiller 9 is maintained at a rate sufficient both to provide sufficient residence time of the gaseous mixture inside the shell 11 to freeze out the impurities from the gaseous mixture and also to entrain the frozen impurities from the bottom of chiller 9 into conduit 29. The velocity can range from 1–100 feet per minute preferably 1–6 feet per minute. The flow path of the gaseous vapor containing the entrained solids is diverted through conduit 35 and cooler 7 to a suitable recovery area (not shown). The angle of diversion is sufficient to enable the solids to be separated from the gaseous stream into heat exchanger 5 wherein they are melted and passed via conduit 31 to knockout vessel 33, without clogging conduit 35. This angle depends on the velocity of the mixture in conduit 29 and must be at least 75°, preferably, as shown in the drawing, 90° with respect to the direction of flow from chiller 9.

The size of chiller 9 is not critical but depends on the pressures and velocities of the gaseous mixture in vessel 1. It must be large enough to provide the necessary residence times to freeze out the contaminants from a vaporous stream passing therethrough.

Although only one scraper-chiller 9 has been shown in the drawing, it is within the scope of this invention that a series of chillers can be incorporated to provide greater chilling surface in the event that it is deemed desirable in order to ensure that all the impurities are removed from the gaseous mixture.

A liquid level controller 30 is operatively connected to knockout vessel 33 in order to maintain a predetermined level of liquid therein.

The melted impurities are passed from the dropout tank 33 via conduit 41 to suitable storage (not shown). A valve 39 in conduit 41 is operatively connected to the liquid level controller 30 which maintains a predetermined liquid level in the knockout drum 33.

In order to more fully illustrate the invention described hereinabove, an example is presented which is a particularly desirable embodiment of the present invention but which is not to be construed to unduly limit the invention.

In the chlorination of hydrocarbons followed by the alkylation of said chlorohydrocarbons with benzene at an elevated temperature, gaseous HCl is produced which contains as impurities paraffins and benzene. This gaseous effluent is passed from the alkylation unit 1 via conduit 3 to the chiller 9. The composition of the stream in conduit 3 is as follows.

Composition:
   HCl _____wt. percent__ 99.0
   Inerts _____do____ 0.8
   Benzene+paraffins ($C_9$–$C_{16}$)_ p.p.m__ 1500 to 2000

The temperature of the gaseous effluent leaving the alkylation unit is approximately 300° F. and this temperature is reduced to approximately 60° F. through various heat exchange steps as the effluent passes through conduit 3 into the top of chiller 9. Liquid propane is circulated through inlet 17 and the jacket 15 and out conduit 19, to maintain the temperature in the chilling section 15 at around −30° F. The paraffins and benzene freeze out from the gaseous HCl. The solid paraffin and benzene impurities are scraped from the chiller surfaces by blades 21 and are carried by the gaseous HCl into the conduit 29. The solid impurities fall freely into melter 5 and flow via conduit 31 into the dropout vessel 33. The velocity in conduit 29 is 6 feet per minute whereby the HCl flows into the exit line 35, which is placed at a right angle to the conduit 29 and thereby is separated from the solid paraffin and benzene impurities. The composition of the HCl in the exit line 35 is as follows.

Component:
   HCl _____ 99.0 wt. percent.
   Inerts _____ Approximately .9 wt. percent.
   Benzene and paraffins ($C_9$–$C_{16}$) _____ Less than 1000 p.p.m.

While the instant invention has been described with particularity to a certain embodiment thereof, it is not intended that the scope of the invention be so limited except insofar as particularly defined in the appended claims.

What is claimed is:

1. A method of purifying a gaseous mixture comprising HCl containing a very minor concentration of gaseous paraffin hydrocarbons of 9 to 16 carbon atoms and benzene as solidifiable impurities, comprising the steps of passing said gaseous mixture thru an elongated zone having walls capable of transmitting heat; cooling said mixture in said zone to the point wherein said impurities precipitate from said mixture on said walls; scraping the precipitate from said walls to form a mixture of gaseous HCl and precipitated solid impurities; maintaining the velocity of the gas-solids mixture in the range of 1–100 feet per minute so as to carry the solids from said zone in a straight line of flow; diverting the gaseous HCl phase of said mixture from said line of flow to free same of said solids by the inertia of said solids; heat exchanging said gaseous HCl free of solids with said gaseous mixture prior to the cooling step; heat exchanging said gaseous mixture prior to the immediately preceding step with said solids; and recovering said gaseous HCl in purified form.

2. A method of purifying a gaseous mixture comprising HCl containing a very minor concentration of gaseous paraffin hydrocarbons of 9 to 16 carbon atoms and benzene as solidifiable impurities, comprising the steps of passing said gaseous mixture thru an elongated zone having walls capable of transmitting heat; cooling said mixture in said zone to the point wherein said impurities precipitate from said mixture on said walls; scraping the precipitate from said walls to form a mixture of gaseous HCl and precipitated solid impurities; maintaining the velocity of the gas-solids mixture in the range of 1–100 feet per minute so as to carry the solids from said zone in a straight line of flow; diverting the gaseous HCl phase of said mixture from said line of flow to free same of said solids by the inertia of said solids; passing the thus separated solids through a heat exchange to melt said thus separated solids; and recovering the thus diverted gaseous HCl phase as a purified HCl product.

3. A method according to claim 2 wherein said mixture is cooled to a temperature of at least −20° F.

4. A method according to claim 2 wherein said gaseous mixture enters an upper portion of said zone and flows downwardly therethrough to a lower portion thereof, said line of flow from said lower portion of said zone being downwardly whereby gravity assists in the separation of said solid from said gas.

5. A method according to claim 2 wherein the thus melted solids are collected in an accumulation zone.

References Cited

UNITED STATES PATENTS

| | | | |
|---|---|---|---|
| 1,957,006 | 5/1934 | Wescott | 55—69 |
| 3,260,059 | 7/1966 | Rosenberg et al. | 62—28 |

FOREIGN PATENTS

| | | |
|---|---|---|
| 230,558 | 9/1960 | Australia. |
| 1,025,385 | 4/1966 | Great Britain. |

REUBEN FRIEDMAN, *Primary Examiner.*

C. N. HART, *Assistant Examiner.*